(12) United States Patent  
Burnett

(10) Patent No.: US 6,392,823 B1  
(45) Date of Patent: May 21, 2002

(54) APPARATUS FOR EXAMINATION OF THE BOTTOM OF THE FOOT

(76) Inventor: David J. Burnett, 641 Santa Fe TRail, Kansas City, MO (US) 64145

( * ) Notice: Subject to any disclaimer, the term of this patent is extended or adjusted under 35 U.S.C. 154(b) by 0 days.

(21) Appl. No.: 09/697,487

(22) Filed: Oct. 26, 2000

Related U.S. Application Data

(60) Provisional application No. 60/162,020, filed on Oct. 28, 1999.

(51) Int. Cl.[7] .............................. G02B 27/02; G02B 3/00
(52) U.S. Cl. ........................ 359/803; 359/802; 359/809
(58) Field of Search ................................ 359/802, 803, 359/809, 804, 810, 811, 812, 815, 838, 871, 879, 882; D16/134, 135, 136

(56) References Cited

U.S. PATENT DOCUMENTS 3,612,649 A * 10/1971 Pusey ......................... 359/809  
6,090,050 A *  7/2000 Constatinides .............. 600/549

* cited by examiner

Primary Examiner—Georgia Epps  
Assistant Examiner—Saeed Seyrafi  
(74) Attorney, Agent, or Firm—Chase Law Firm, L.C.

(57) ABSTRACT

A foot examination device is presented including a mirror held in a base member, which is controlled and held in a person's hand, which also includes a footrest to allow the user to rest his or her foot at an angle proximate the mirror so that the person can see the bottom of his or her foot easily.

13 Claims, 2 Drawing Sheets

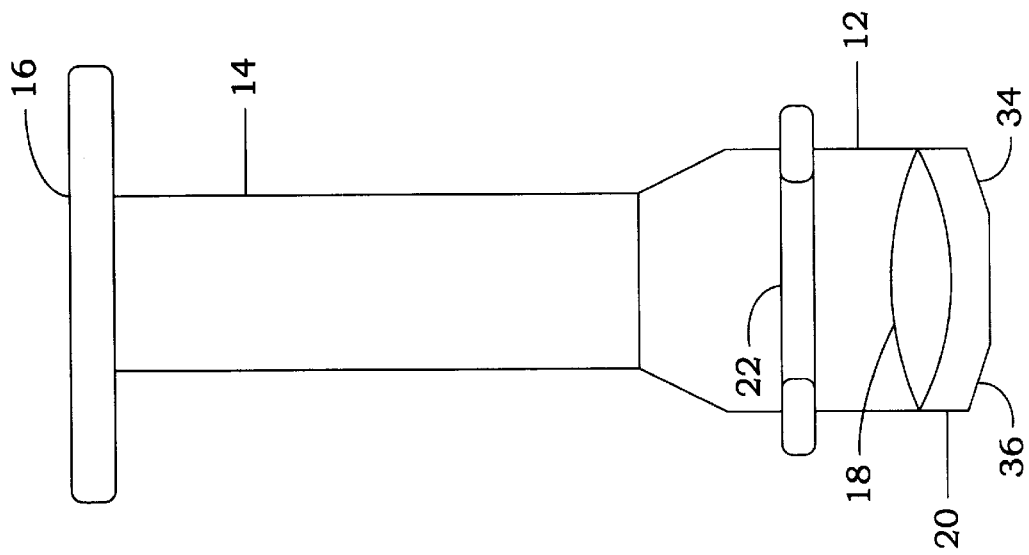
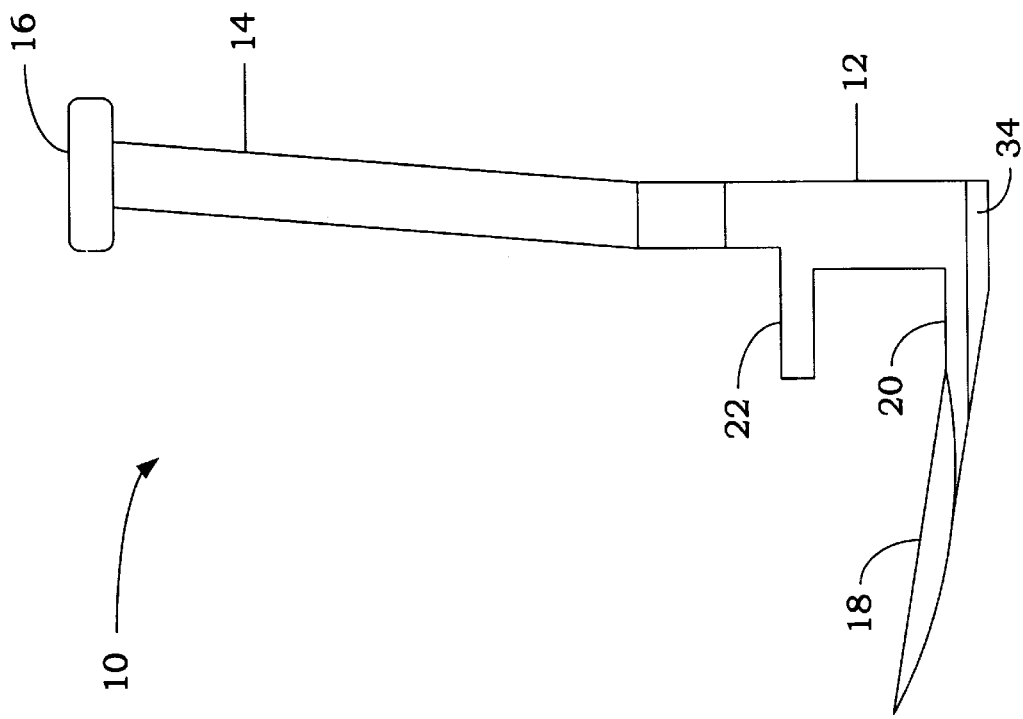

APPARATUS FOR EXAMINATION OF THE BOTTOM OF THE FOOT

This application claims benefit of provisional application Ser. No. 60/162,020 filed Oct. 28, 1999.

BACKGROUND OF THE INVENTION

This invention relates to an apparatus for viewing the bottom of a foot and, in particular, to an apparatus with a magnifying mirror and footrest to allow people with diabetes to effectively examine the bottom of their feet.

A high number of diabetic ulcers develop in people with diabetes in areas where they do not feel pain or where there is poor blood flow, such as in their feet. Many with diabetes are older with vision problems and arthritis which makes it very difficult for them to bend over and examine their feet, especially the bottom of their feet. Ulcers, lesions, sores or other injuries not identified or discovered early in the process may result in gangrene and possibly amputation.

SUMMARY OF THE INVENTION

It is therefore a primary object of the present invention to provide a device for examining the bottom of a foot employing a footrest which allows proper placement of the foot to be examined.

Another important object of the present invention is to provide a device for examining the bottom of a foot employing a footrest, which supports the foot in a still position to allow for a more accurate examination.

Yet another important object of the present invention is to provide a device for examining the bottom of a foot as aforesaid which incorporates the use of a magnifying mirror for those with vision difficulties to enable detection of small lesions.

Still another important object of the present invention is to provide a device for examining the bottom of a foot as aforesaid, which is supported on the floor and includes a handle for user control Another important object of the present invention is to provide a device for examining the bottom of a foot as aforesaid which can be easily turned from one side to the other to allow easy examination or both the left and right foot.

Yet another important object of the present invention is to provide a device for examining the bottom of a foot as aforesaid which is relatively easy to use.

These and other objects of the present invention are achieved by a free standing device that includes a base member with a footrest and an arm extending from the base to a handle that is grasped by the device user. A mirror is mounted to the base member below the footrest and angled toward the footrest to allow the user to view the bottom of his or her foot which is placed on the footrest without having to bend over too far or to twist his or her foot or head around to view the bottom of the foot. Other objects and advantages of this invention will become apparent from the following description taken in connection with the accompanying drawings, wherein is set forth by way of illustration and example, a now preferred embodiment of this invention.

BRIEF DESCRIPTION OF THE DRAWINGS

FIG. 1 is a front elevational view of a foot examination device.

FIG. 2 is a side elevational view of the foot examination device of FIG. 1.

DESCRIPTION OF THE PREFERRED EMBODIMENT

Figure 4:
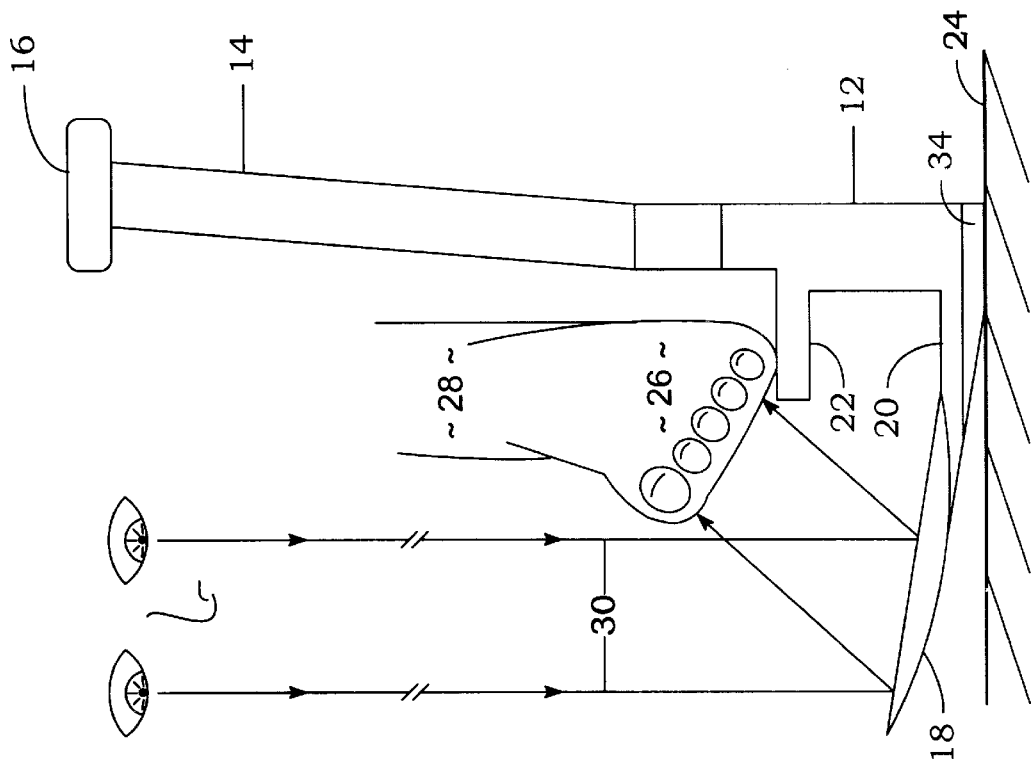
FIG. 4 is the device as shown in FIG. 1 illustrating the lines of sight.
Figure 3:
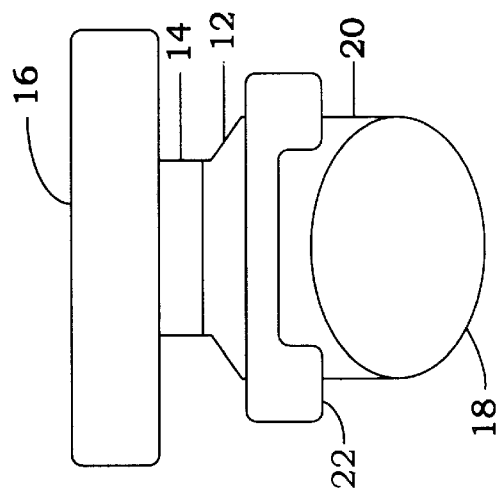
FIG. 3 is a top view of the foot examination device of FIG. 1.

Turning more particularly to the drawings, FIG. 1–4 illustrate a foot examination device 10 having a base 12, an arm 14 projecting generally upwardly and outwardly therefrom, and a handle 16 at the end of arm 14 opposite base 12. A mirror 18 is mounted to a mirror support arm 20 projecting inwardly and generally perpendicularly to base 12. A footrest 22 extends inwardly from base 12 above mirror support arm 20. Footrest 22 is generally U-shaped or horseshoe-shaped and lies above and to the side of mirror 18. Mirror 18 is angled toward footrest 22 by approximately 30–50 degrees from the horizontal plane of floor 24.

In the preferred embodiment shown in the drawings, base 12 of foot examination device 10 is supported on the floor 24. Foot examination device 10 may be controlled by a user by grasping handle 16 at the end of arm 14 to allow the user to position mirror 18 and support their foot 26 and leg 28 on footrest 22. Mirror 18 is angled toward footrest 22 to allow a person to look down along lines of sight 30 to see the reflection of the bottom of their foot 32 resting on footrest 22. Alternatively, mirror 18 may be pivotally mounted to support arm 20 to allow the user to move mirror 18 to better view the bottom of their foot 32.

The shape of footrest 22 allows for the foot 26 to be supported while still allowing adequate visualization of the bottom of the foot 32 through the open area of the U.

The footrest 22 may be covered with rubber, Spenco® or other similar material to allow the foot 26 to be placed on the footrest 22 securely without sliding off. Mirror 18 may be pivotally mounted to support arm 20 to allow adjustment of the mirror 18 to better view the bottom 32 of foot 26.

The front 34 and back 36 bottom portions of base 12 may be beveled as shown in FIG. 2, to provide a support surface when foot examination device 10 is tilted toward the user as necessary during use. Beveled portions 34 and 36 of base 12, and the bottom of base 12 may include a non-slip surface such as rubber to help prevent device 10 from slipping during use. Base 12, arm 14, handle 16, mirror support arm 20 and footrest 22 may be made from molded or injected plastic. Device 10 is designed such that it may be turned around and used for both the right and left foot.

With the user sitting in a regular kitchen-type chair in a room with good lighting, device 10 is placed by the user to the outside of the foot that is going to be examined first. Using handle 16, the person can position device 10 to a place where they may view mirror 18. With device 10 on the right side to examine the right foot, the person places their bare foot onto footrest 22 while holding and supporting device 10 by handle 16 with their right hand.

The foot should be placed angled on its side so that the bottom of the foot is facing mirror 18. The person may then look down along the lines of sight 30 into the magnifying mirror 18 and examine the bottom of their foot for lesions, red marks, scrapes, sores, etc. A person may move the device 10 or their foot forwards or backwards to assure that the entire plantar aspect of the foot is examined. The person should then remove their right foot, turn device 10 around with the handle 16 and position device 10 on their left side to examine their left foot in the same manner.

The above-mentioned activity should become the daily routine of all diabetic patients, especially those with peripheral neuropathy and/or poor vascular manifestations. Routine examination of the bottom of the foot with device 10 described above is important in the prevention of serious ulcers which create multiple problems for people with diabetes. Device 10 incorporates the use of a magnifying mirror 18 which helps people who have decreased vision, due to diabetes examine their feet, as well as to make identification of small lesions more likely.

The device 10 has a long arm 14 extending to handle 16 that can be held in the user's hand to give him or her better control of device 10 which is supported by floor 24, increasing the ease of use for those people who have extensive arthritic or back problems. Footrest 22 supports the foot being examined allowing the person to examine the foot thoroughly. Support of the foot is important as an unsupported foot may shake or move too much or the person may fatigue quickly which decreases the ability to accurately examine the foot.

It is to be understood that while certain forms of this invention have been illustrated and described, it is not limited thereto, except in so far as such limitations are included in the following claims.

Having thus described the invention, what is claimed as new and desired to be secured by letters patent is:

1. A foot examination device for examining the bottom of a foot comprising:

a base having upper and lower ends, an arm presenting an upper handle end and a lower end secured to said base upper end, a footrest having a fixed end secured to said base upper end and a free end extending away from said base, a mirror mounting arm having a fixed end secured to said base lower end and a free end projecting away from said base, a mirror mounted on said mirror mounting arm and angled toward said footrest, whereby the bottom of the foot resting on said footrest may be viewed in said mirror.

2. The foot examination device as claimed in claim 1 wherein said mirror is a magnifying mirror.

3. The foot examination device as claimed in claim 1 wherein said footrest is generally U-shaped.

4. The foot examination device as claimed in claim 1 wherein said base includes a non-slip surface.

5. The foot examination device as claimed in claim 1 wherein said mirror is pivotally mounted on said mirror mounting arm.

6. A foot examination device for examining the bottom of a foot comprising:

a generally L-shaped base having a generally vertically extending arm and a generally horizontally extending lower arm, a mirror mounted to said lower arm, and a footrest secured to said base above said lower arm.

7. The foot examination device as claimed in claim 6 wherein said mirror is pivotally mounted to said lower arm for adjustment of said mirror.

8. The foot examination device as claimed in claim 6 wherein said mirror is a magnifying mirror.

9. The foot examination device as claimed in claim 6 wherein said footrest is generally U-shaped.

10. The foot examination device as claimed in claim 6 further comprising a handle secured to said vertically extending arm opposite said lower arm.

11. A foot examination device for examination the bottom of a foot, comprising:

a generally inverted F-shaped base having a generally vertically extending arm, a lower arm, and a footrest, said vertically extending arm having a first end and a second end, said lower arm extending generally horizontally from said first end of said vertically extending arm, said footrest arm extending generally horizontally from said vertically extending arm between said lower arm and said second end of said vertically extending arm, a mirror, and means for mounting said mirror to said lower arm for reflecting images of the bottom of a foot resting on said footrest arm.

12. The foot examination device as claimed in claim 11 wherein said mirror is a magnifying mirror.

13. The foot examination device as claimed in claim 11 wherein said footrest arm is generally U-shaped.

* * * * *